United States Patent
Yoshida

(10) Patent No.: US 9,483,384 B2
(45) Date of Patent: Nov. 1, 2016

(54) GENERATION OF SOFTWARE TEST CODE

(71) Applicant: FUJITSU LIMITED, Kawasaki-shi, Kanagawa (JP)

(72) Inventor: Hiroaki Yoshida, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/549,516

(22) Filed: Nov. 20, 2014

(65) Prior Publication Data

US 2016/0147633 A1    May 26, 2016

(51) Int. Cl.
*G06F 9/44*        (2006.01)
*G06F 11/36*       (2006.01)

(52) U.S. Cl.
CPC ............... *G06F 11/368* (2013.01); *G06F 8/71* (2013.01)

(58) Field of Classification Search
CPC .................................................... G06F 11/368
See application file for complete search history.

(56) References Cited

U.S. PATENT DOCUMENTS

| 9,043,759 | B1 * | 5/2015 | Lininger | G06F 11/3684 717/106 |
| 9,063,818 | B1 * | 6/2015 | Risbood | G06N 99/005 |
| 2006/0010429 | A1 * | 1/2006 | Ihara | G06F 11/3684 717/126 |
| 2011/0307860 | A1 * | 12/2011 | Park | G06F 8/30 717/107 |
| 2012/0084756 | A1 * | 4/2012 | Subramanian | G06F 11/3676 717/124 |
| 2012/0240097 | A1 * | 9/2012 | Saunders | G06F 8/20 717/103 |
| 2012/0284697 | A1 * | 11/2012 | Choppakatla | G06F 11/3612 717/127 |
| 2012/0311541 | A1 * | 12/2012 | Bullard | G06F 11/368 717/127 |
| 2013/0346947 | A1 * | 12/2013 | Braverman | G06F 11/368 717/124 |
| 2015/0007126 | A1 * | 1/2015 | Koutyrine | G06Q 10/06 717/101 |

OTHER PUBLICATIONS

"Using Pull Requests as Code Reviews", Bhanu Chaudhary, Oct. 16, 2014, retrieved from http://code.tutsplus.com/tutorials/using-pull-requests-as-code-reviews--cms-21959 on Dec. 30, 2015.*
Using pull requests, https://help.github.com/articles/using-pull-requests/ retrieved Nov. 20, 2014.

* cited by examiner

*Primary Examiner* — Philip Wang
(74) *Attorney, Agent, or Firm* — Maschoff Brennan

(57) ABSTRACT

A method may include detecting a change in a user repository that includes product code and test code. The product code and the test code may correspond to a software program. The change in the user repository may include a change in the product code with a corresponding changed portion of the product code. The method may also include generating, by a test tool, a test code update for the test code. The test code update may be generated based on detecting the change in the user repository and based on the changed portion of the product code. The method may further include communicating a pull request that requests that the user repository add the test code update to the user-managed repository.

10 Claims, 4 Drawing Sheets

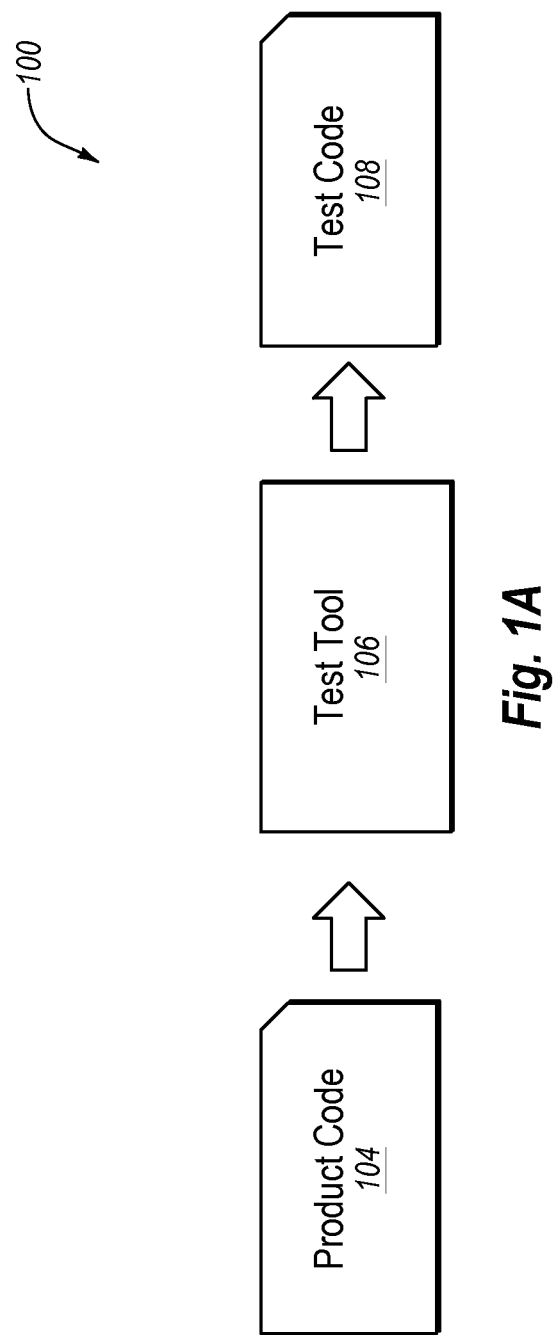

GENERATION OF SOFTWARE TEST CODE

FIELD

The embodiments discussed herein are related to generating software test code.

BACKGROUND

Testing software, such as validating or verifying software, is a common activity among information technology (IT) organizations and software developers. For example, whether the software is a desktop application for execution at one or more client computer systems, mobile device application for execution on a mobile device, or a web application for execution at one or more server computer systems, it is often important to verify the quality of the software. While some types of errors in software cause only annoyance or inconvenience to users, other types of errors have the potential to cause other problems, such as data and financial loss. Test code is often used to test software in which the test code may provide inputs and conditions to the software to determine if the software behaves as intended.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include detecting a change in a user repository that includes product code and test code. The product code and the test code may correspond to a software program. The change in the user repository may include a change in the product code with a corresponding changed portion of the product code. The method may also include generating, by a test tool, a test code update for the test code. The test code update may be generated based on detecting the change in the user repository and based on the changed portion of the product code. The method may further include communicating a pull request that requests that the user repository add the test code update to the user-managed repository.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1A is a diagram representing an example system configured to generate test code of a software program;

DESCRIPTION OF EMBODIMENTS

Figure 1B:
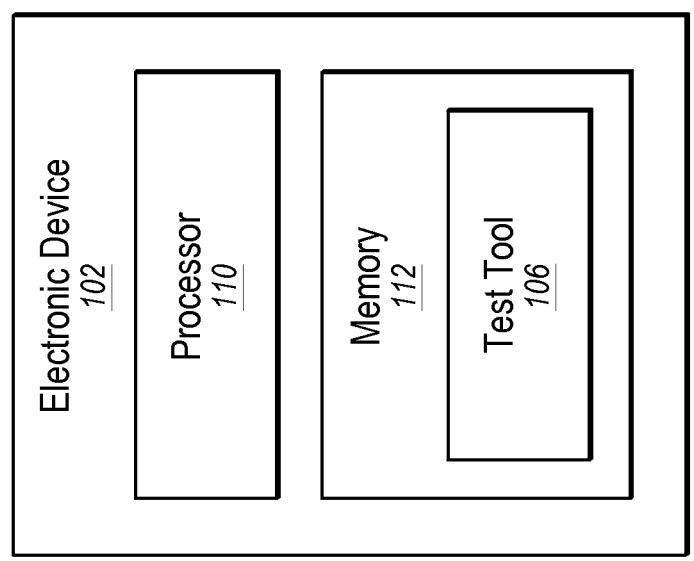
FIG. 1B illustrates an example electronic device that may include a test tool configured to generate test code.

Some embodiments described herein relate to methods and systems of generating test code of a software program in a local development environment, a cloud-based development environment, or any combination thereof. As detailed below, a test tool may be communicatively coupled to a user repository of a software developer that may include product code and test code that correspond to a software program. The operations performed by the test tool described herein may provide an interface between developer tools (e.g., the test tool) and software developers that may improve the utility of developer tools for the software developers.

Specifically, the test tool may be configured to monitor the user repository for changes in the user repository. For example, the test tool may be configured to monitor the user repository for changes in the product code.

In some embodiments, the change in the user repository may include a change in the product code corresponding to the software program. The change in the product code may be referred to as a "changed portion" and may include any portion of the product code that may include any applicable modification to the product code. For example, the changed portion may include a newly added portion of the product code, a portion of the product code (e.g., a function) with a recent deletion, or any combination thereof. Additionally, or alternatively, the changed portion may include any portion of the product code that may not have changes in its lines, but that may have been affected by a change in the product code.

The test tool may be configured as a developer tool that may generate a test code update for the test code of the software program based on the changed portion. The test code update may include test code that is generated for the changed portion. In some embodiments, the test tool may be configured to generate the test code update for a portion of the product code that includes the changed portion of the product code and not for the entire product code.

In some embodiments, the user repository may be managed by a first entity (e.g., a software developer) and the test tool may be managed by a second entity (e.g., a tool services entity). Additionally, in some embodiments, the first entity may determine what may or may not be added to the user repository. As such, in some embodiments, the test tool may be configured to generate and communicate a pull request that may request that the test code update be added to the user repository.

In some embodiments, the pull request may be communicated to the user repository and may indicate the creation of the test code update. An administrator of the user repository may determine whether or not to add the test code update. When the determination is made to add the test code update to the user repository, the administrator may direct that the user repository pull the test code update via a pull command that may be communicated to the test tool. The test tool may then communicate the test code update to the user repository in response to the pull command such that the test code update may be added to the user repository. Reference of communication to the user repository by the test tool may include communication to one or more electronic devices (e.g., servers, personal computers, mobile devices, etc.) associated with an account of the administrator of the user repository and/or to one or more electronic devices that may have access to the user repository. Therefore, reference of communication to the user repository is not limited to direct access to the user repository by the test tool.

Embodiments of the present disclosure are explained with reference to the accompanying drawings.

FIG. 1A is a diagram representing an example system configured to generate test code of a software program, arranged in accordance with at least one embodiment described herein. The system 100 may include a test tool 106 configured to generate test code 108 based on product code 104 of a software program.

The product code 104 may include electronic data, such as, for example, libraries, applications, scripts, or other logic or instructions for execution by a processing device. In some embodiments, the product code 104 may include a complete instance of the software program. In these or other embodiments, the product code 104 may include a portion of the software program. The product code 104 may be written in any suitable type of computer language that may be used for event-driven software applications.

The test tool 106 may be configured to receive the product code 104 and to generate the test code 108 for the product code 104. The test code 108 like the product code 104 may include electronic data, such as, for example, libraries, applications, scripts, or other logic or instructions for execution by a processing device. Additionally, the test code 108 may include inputs, libraries, applications, scripts, or other logic or instructions that may form a test bench of one or more portions of the product code 104. The test bench may include a series of instructions, inputs, or operations that may test the functionality of the product code 104. As such, the test code 108 may help improve the product code 104 by helping to identify bugs or other problems with the product code 104.

As indicated above and described below, in some embodiments, the product code 104 may include a changed portion of product code of the software program that may be included in a user repository associated with the software program. In these or other embodiments, the test code 108 may include a test code update for test code of the software program, which may also be included in the user repository.

FIG. 1B illustrates an example electronic device 102 that may include the test tool 106, according to at least one embodiment described herein. The electronic device 102 may include any suitable system, apparatus, or device configured to test the product code 104 using the test tool 106. The electronic device 102 may include a processor 110 communicatively coupled to a memory 112. In some embodiments, the test tool 106 may be embodied in logic or instructions resident in the memory 112 for execution by the processor 110.

The processor 110 may include any suitable special-purpose or general-purpose computer, computing entity, or processing device including various computer hardware or software modules and may be configured to execute instructions stored on any applicable computer-readable storage media. For example, the processor 110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1B, it is understood that the processor 110 may include any number of processors configured to perform any number of operations individually or collectively. Additionally, one or more of the processors may be present on a different electronic device. In some embodiments, the processor 110 may interpret and/or execute program instructions and/or process data stored in the memory 112.

The memory 112 may include computer-readable storage media for carrying or having computer-executable instructions or data structures stored thereon. Such computer-readable storage media may be any available media that may be accessed by a general-purpose or special-purpose computer, such as the processor 110. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 110 to perform a certain function or group of functions.

The test tool 106 may include instructions and data configured to cause the processor 110 to perform the operations described with respect to the test tool 106. Accordingly, in some embodiments, the electronic device 102 may incorporate the test tool 106 in the memory 112 as illustrated in FIG. 1B.

Figure 2:
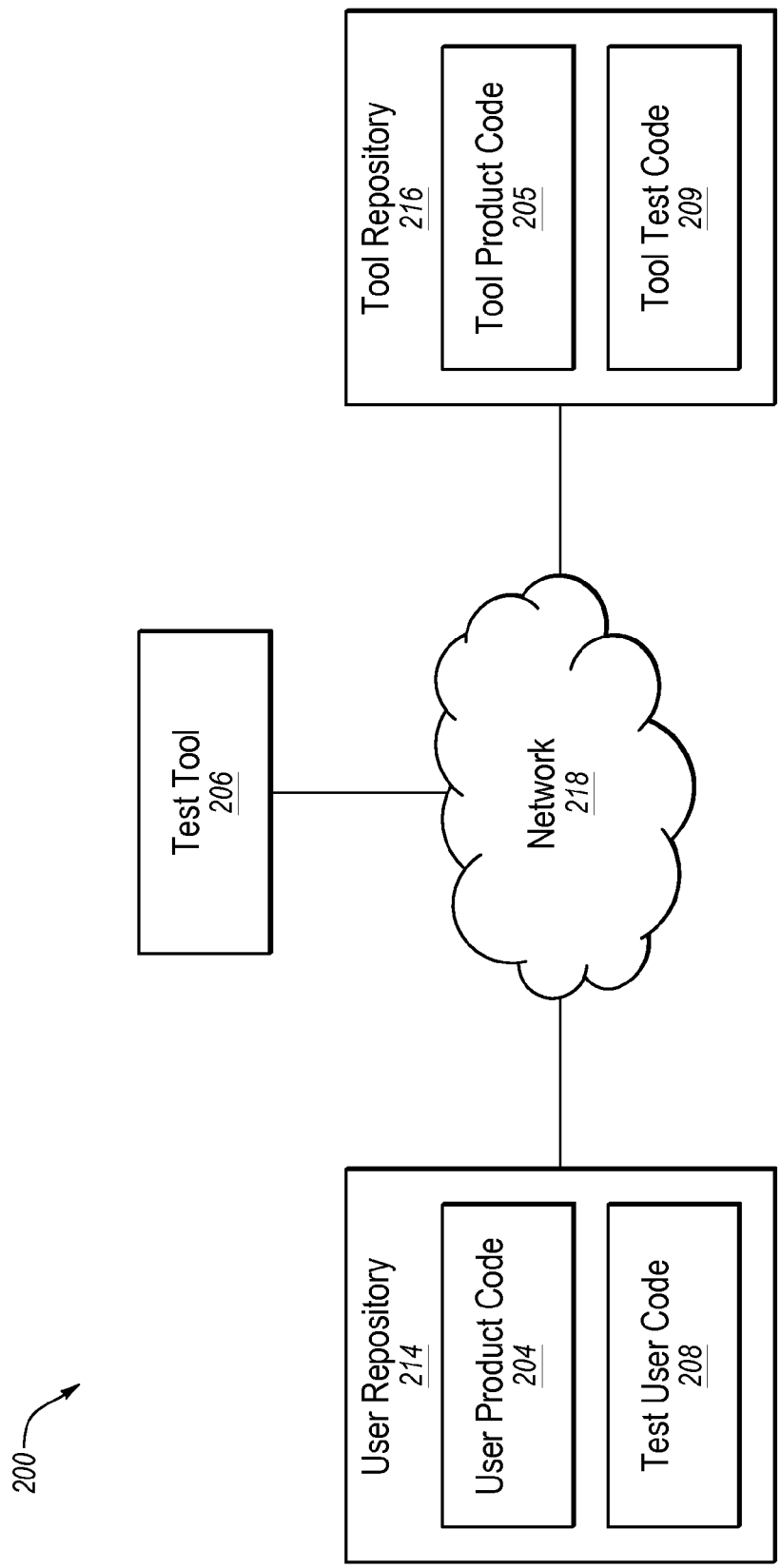
FIG. 2 is a diagram of an example system that may be configured to update test code associated with product code of a user repository.

FIG. 2 is a diagram of an example system 200 that may be configured to update test code associated with product code of a user repository, according to at least one embodiment described herein. The system 200 may be configured as a cloud-based developer environment and may include a user repository 214, a test tool 206, a tool repository 216, and a network 218.

The user repository 214 may be configured to manage user product code 204 and user test code 208 that may correspond to a software program. Use of the term "manage" with respect to code may refer to and include operations that are associated with storing, maintaining, updating, deleting, or any combination thereof, that may be performed with respect to the code. Additionally, the user repository 214 may be managed by one or more developers who may be developing the software program that may correspond to the user product code 204 and the user test code 208.

The user product code 204 may be analogous to the product code 104 described with respect to FIG. 1A. Similarly, the user test code 208 may be analogous to the test code 108 described with respect to FIG. 1A. The term "user" is used with respect to the user product code 204 and the user test code 208 to indicate that the user product code 204 and the user test code 208 may be managed by the user repository 214. Further, in the present disclosure the term "user code" may generically denote the user product code 204, the user test code 208, or any combination thereof.

In some instances, reference to the user repository 214 in the present disclosure may also refer to the user code that may be managed by the user repository 214. For example, reference to monitoring the user repository 214 may refer to monitoring the user code that may be managed by the user repository 214. Similarly, reference to a change in the user repository 214 may refer to a change in the user code managed by the user repository 214. Moreover, reference to cloning or copying the user repository 214 may refer to cloning or copying the user code managed by the user repository 214.

The user repository 214 may include any suitable apparatus, system, or device configured to manage the user product code 204 and the user test code 208. For example, the user repository 214 may include one or more electronic devices (e.g., servers) with associated processors or memory such as the processor 110 and the memory 112 described above with respect to FIG. 1B.

The tool repository 216 may be configured to manage tool product code 205 and tool test code 209. In some embodiments, the tool product code 205 may be based on the user product code 204 and the tool test code 209 may be based on the user test code 208. For example, in some embodiments, the user product code 204 may be cloned to generate the tool product code 205 such that the tool product code 205 may include a copy of the user product code 204. Similarly, in these or other embodiments, the user test code 208 may be cloned to generate the tool test code 209 such that the tool test code 209 may include a copy of the user test code 208. As detailed below, in some embodiments, the test tool 206 may be configured to perform operations associated with the cloning of the user product code 204, the cloning of the user test code 208, or any combination thereof.

The term "tool" is used with respect to the tool product code 205 and the tool test code 209 to indicate that the tool product code 205 and the tool test code 209 may be managed by the tool repository 216 and an associated developer tool (e.g., the test tool 206). Further, in the present disclosure the term "tool code" may generically denote the tool product code 205, the tool test code 209, or any combination thereof. Moreover, in some instances, reference to the tool repository 216 in the present disclosure may also refer to the tool code that may be managed by the tool repository 216, similar to how reference to the user repository 214 may also refer to the user code that may be managed by the user repository 214.

The tool repository 216 may include any suitable apparatus, system, or device configured to manage one or more of the tool product code 205 and the tool test code 209. For example, the tool repository 216 may include one or more electronic devices (e.g., servers) with associated processors or memory such as the processor 110 and the memory 112 described above with respect to FIG. 1B.

The network 218 may include any interconnecting system capable of transmitting audio, video, signals, data, messages, or any combination of the preceding. For example, the network 218 may include all or a portion of a public switched telephone network (PSTN), a public or private data network, a local area network (LAN), a metropolitan area network (MAN), a wide area network (WAN), a cellular network, a local, regional, or global communication or computer network such as the Internet, a wireline or wireless network, an enterprise intranet, other suitable communication link, or any combination of the preceding. In the illustrated example, the test tool 206, the user repository 214, and the tool repository 216 are illustrated as being individually communicatively coupled via the network 218. However, the present disclosure is not limited to such an embodiment. For example, in some embodiments, the test tool 206 may be included in the tool repository 216 such that they may be jointly communicatively coupled to the user repository 214 via the network 218. Additionally or alternatively, the tool repository 216 may be communicatively coupled to the user repository 214 via the communicative coupling between the test tool 206 and the user repository 214.

The test tool 206 may be analogous to the test tool 106 described with respect to FIGS. 1A and 1B. In some embodiments, the test tool 206 may be configured to perform one or more operations with respect to the user repository 214 and the tool repository 216. The operations may be such that the test tool 206 may generate updates for the user code and manage the tool repository 216 such that it may maintain a copy of the user code as test code. Therefore, the operations performed between the test tool 206 and the user repository 214 may provide an interface between the developers of the software program associated with the user code and a developer tool (e.g., the test tool 206).

Figure 3:
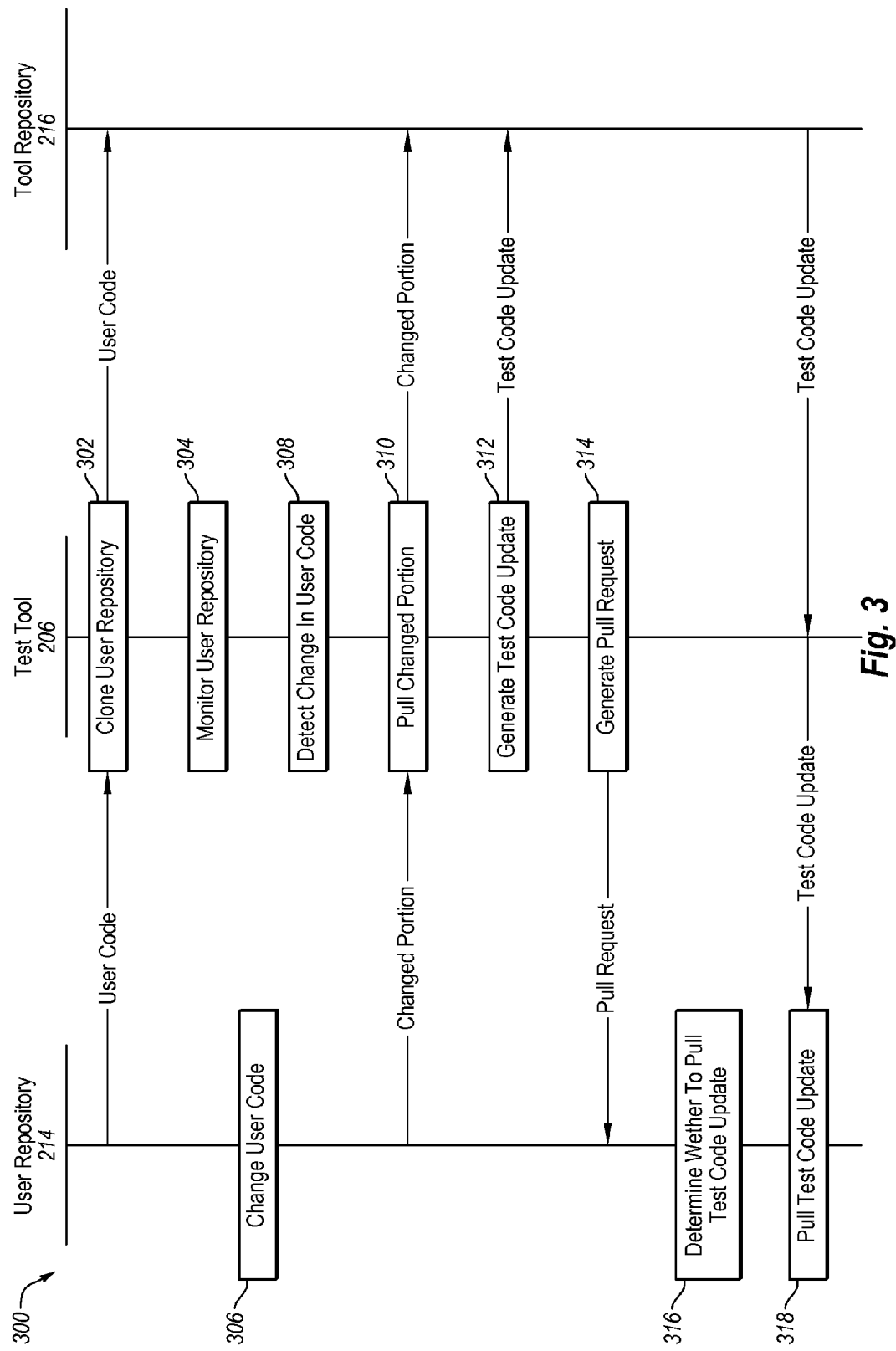
FIG. 3 illustrates an example communication process that may be performed to interface a test tool with a user repository.

FIG. 3 illustrates an example communication process 300 ("process 300") that may be performed to interface the test tool 206 with the user repository 214, according to at least one embodiment described herein. Although the operations of the process 300 are described in a specific order and manner, one or more of the operations of the process 300 may be performed in a different order than that explicitly described. Additionally, one or more operations may be performed concurrently. Moreover, one or more of the operations may include additional operations not expressly described or may have one or more described operations omitted.

At an operation 302 of the process 300, the test tool 206 may "clone" (also referred to as "fork") the user repository 214. Specifically, the test tool 206 may copy the user code managed by the user-repository 214 (e.g., the user product code 204, the user test code 208, or any combination thereof). At operation 302, the test tool 206 may direct that the copied user code be stored in the tool repository 216 as tool code that may be managed by the tool repository.

At an operation 304, the test tool 206 may monitor the user repository 214 for changes in the user code. For example, in some embodiments, the test tool 206 may monitor the user product code 204 for changes in the user product code 204.

At an operation 306, a change may be committed to the user repository 214. For example, the user product code 204 may be updated or changed at the operation 306. Therefore, after the operation 306, the user product code 204 may include a changed portion. In some embodiments, the change may be committed to the user repository 214 by an administrator (e.g., a software developer) of the user repository 214.

At an operation 308, based on the monitoring of the user repository 214, the test tool 206 may detect the change in the user repository 214 (e.g., the change in the user product code 204). In some embodiments, the test tool 206 may receive an indication from the user repository 214 indicating that a change has been made to the user product code 204. Additionally or alternatively, the indication may indicate the location of the changed portion of the user product code 204 in the user product code 204. In these or other embodiments, the user repository 214 may update with the changed portion and may generally publish the update. As such, in some embodiments, the test tool 206 may be configured to detect the publication of the update and thus may detect the update and corresponding changed portion. The above are merely examples of how the test tool 206 may detect the change in the user code that may be entered at operation 306.

At operation 310, the test tool 206 may pull the changed portion from the user repository 214 in response to detecting the change in the user code. In some embodiments, the test tool 206 may communicate the changed portion to the tool repository 216. Specifically, the test tool 206 may direct that the changed portion be added to the tool product code 205 of the tool repository 216 such that the tool product code 205 may be updated in response to the change in the user product code 204.

At operation 312, the test tool 206 may generate a test code update based on the changed portion. In some embodiments, the test tool 206 may be configured to direct that the test code update be added to the tool test code 209 of the tool repository 216.

In some embodiments, the test tool 206 may generate test code for the changed portion to generate the test code update. Additionally, the test code update may be generated as a subset of the test code (e.g., the user test code 208 and/or the tool test code 209) associated with the corresponding software program such that the test code update may be principally generated for the changed portion, but not the entire product code (e.g., the user product code 204 and/or the tool product code 205) associated with the corresponding software program. By contrast, other tool-based techniques that may generate test code when product code is updated may generate new test code for the entire product code and not just a changed portion of the product code. Such other techniques may make it difficult to determine which changes may have been made to the test code due to the change in the product code.

Therefore, the test code update for the changed portion may facilitate debugging and improvement of the changed portion over other techniques by being identifiable as corresponding to the changed portion based on the test code update being generated for the changed portion. In some embodiments, the test tool 206 may be configured to generate an indication that the test code update corresponds to the changed portion. Therefore, identification of the test code update as corresponding to the changed portion may be further facilitated, which may also further facilitate debugging the changed portion as compared to other techniques.

Some versions of test code may have a high quality rating ("high quality test code") in which the high quality test code may provide a relatively robust test of the associated product code. However, test times associated with testing the associated product code with the high quality test code may be relatively slow. Additionally or alternatively, as the "quality" of the test code goes down, the corresponding test times may also go down, which may increase the speed of the testing. Therefore, in some embodiments, the test tool 206 may be configured to generate more than one version of the test code update at the operation 312. The different versions of the test code update may have different quality ratings such that a specific version of the test code update may be selected depending on a target degree of quality and/or a target test time. In these or other embodiments, each version of the test code update may be added to the tool test code 209. Additionally, general reference to the test code update may also refer to different versions of the test code update where applicable.

In some embodiments, the different versions of the test code update may be generated based on a branching mechanism in a version control system. The branching mechanism may include any suitable mechanism that may allow for generating multiple versions of the test code update while maintaining each version of the test code update to allow selection of one or more of the test code updates.

At operation 314, the test tool 206 may generate a pull request that may be communicated to the user repository 214. In some embodiments, the test tool 206 may be configured to generate the pull request in response to the generation of the test code update at the operation 312. The pull request may indicate to the user repository 214 that the test code update has been generated for the changed portion. As indicated above, reference of communication to the user repository 214 by the test tool 206 may include communication to one or more electronic devices (e.g., servers, personal computers, mobile devices, etc.) associated with an account of an administrator of the user repository 214 and/or to one or more electronic devices that may have access to the user repository 214.

At operation 316, the user repository 214 may determine whether or not to pull the test code update to add the test code update to the user test code 208. Additionally or alternatively, the user repository 214 may determine which versions of the test code update to add to the user test code 208. With respect to operation 316, reference of operations or actions that may be performed by the user repository 214 may also refer to operations or actions that may be performed by an administrator of the user repository 214. For example, in some embodiments, the determination at operation 316 may be made by an administrator of the user repository 214. Additionally, or alternatively, the determination may be made by an automated system of the user repository 214.

In some embodiments, the user repository 214 (e.g., an administrator of the user repository 214) may have access to the tool repository 216 in that the user repository 214 (e.g., an administrator of the user repository 214) may be able to view the tool code of the tool repository 216. Therefore, in some embodiments, at operation 316, the user repository 214 (e.g., an administrator of the user repository 214) may view the test code update and its different versions that may be stored as part of the tool test code 209 in order to determine whether to include the test code update with the user test code 208. Additionally, in some embodiments, the test code update and its different versions may be indicated as corresponding to the changed portion as described above to facilitate identification by the user repository 214 that the test code update corresponds to the changed portion. Therefore, debugging of the product code and the updated portion in particular may be facilitated by identifying for the user repository 214 to which portions of the product code (e.g., the updated portion) the test code update may correspond.

At operation 318, when the user repository 214 determines to include the test code update with the user test code 208, the user repository 214 may pull the test code update. In some embodiments, the user repository 214 may generate a pull command that may be communicated to the test tool 206. The test tool 206 may consequently pull the test code update from the tool repository 216 and communicate the test code update to the user repository 214. The user repository 214 may accordingly add the test code update to the user test code 208. In some embodiments, the user repository 214 may indicate a version or versions of the test code update in the pull command.

In some embodiments, the user repository 214 may have direct access to the tool repository 216 to allow the user repository to pull the test code update from the tool repository 216. In some of these embodiments, the test tool 206 may include routines or instructions within the tool repository 216 that allow for the user repository 214 to directly pull the test code update from the tool repository 216 via a "pull command." Additionally or alternatively, the test tool 206 may act as a gatekeeper between the user repository 214 and the tool repository 216 in that the test tool 206 may control and/or restrict access to the tool repository 216 by the user repository 214 more than routines or instructions that allow direct access.

The process 300 may accordingly provide an interface between the test tool 206 and the user repository 214 during development of the corresponding software program of the user repository 214. One skilled in the art will appreciate that, for the process 300, the operations performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

Additionally, in some embodiments, the system 200 may include more than one test tool where each test tool may manage its own tool repository. In such instances, each test tool may perform the operations described with respect to the process 300 and the user repository 214 may decide which test code updates that may be generated by the different test tools to pull into the user repository 214. In these or other embodiments, the different test tools may be configured to generate different types of test code. Additionally or alternatively, the different test tools may be configured to generate test code for different types or portions of the product code.

As indicated above, the embodiments described herein may include the use of a special purpose or general purpose computer (e.g., the processor 110 of FIG. 1B) including various computer hardware or software modules, as discussed in greater detail below. Further, as indicated above, embodiments described herein may be implemented using computer-readable media (e.g., the memory 112 of FIG. 1B) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
cloning, by a test tool, a user repository that includes user product code and user test code that correspond to a software program, wherein the user repository is managed by a first entity and the test tool is managed by a second entity;
generating, by the test tool, a tool repository based on the cloning of the user repository such that the tool repository includes tool product code that is based on the user product code and such that the tool repository includes tool test code that is based on the user test code;
monitoring, by the test tool, the user repository for changes in the user repository;
detecting, by the test tool based on the monitoring of the user repository, a change in the user repository, wherein the change in the user repository includes a change in the user product code with a corresponding changed portion of the user product code;
updating, by the test tool in response to detecting the change in the user repository, the tool product code in the tool repository with the changed portion;
generating, by the test tool in response to updating the tool product code with the changed portion, a test code update for the tool test code based on the changed portion, wherein generation of the test code update includes generation of test code for the changed portion;

communicating, by the test tool to the user repository, a pull request that requests that the user repository add the test code update to the user repository;

receiving, by the test tool, a pull command from the user repository in response to the user repository receiving the pull request and in response to a determination at the user repository to pull the test code update; and communicating, by the test tool, the test code update to the user repository in response to the pull command.

2. The method of claim 1, wherein the changed portion includes a portion of the user product code that includes one or more of an addition to the user product code and a deletion from the user product code.

3. The method of claim 1, wherein generating the test code update includes generating a plurality of test code versions based on a branching mechanism.

4. The method of claim 1, further comprising, generating, by the test tool, an indication that the test code update corresponds to the changed portion, wherein the indication facilitates identification of the changed portion.

5. The method of claim 1, wherein detecting the change in the user repository includes receiving, by the test tool from the user repository, an indication that the user product code was changed.

6. Non-transitory computer-readable storage media including computer-executable instructions configured to cause a system to perform operations, the operations comprising:

cloning, by a test tool, a user repository that includes user product code and user test code that correspond to a software program, wherein the user repository is managed by a first entity and the test tool is managed by a second entity;

generating, by the test tool, a tool repository based on the cloning of the user repository such that the tool repository includes tool product code that is based on the user product code and such that the tool repository includes tool test code that is based on the user test code;

monitoring, by the test tool, the user repository for changes in the user repository;

detecting, by the test tool based on the monitoring of the user repository, a change in the user repository, wherein the change in the user repository includes a change in the user product code with a corresponding changed portion of the user product code;

updating, by the test tool in response to detecting the change in the user repository, the tool product code in the tool repository with the changed portion;

generating, by the test tool in response to updating the tool product code with the changed portion, a test code update for the tool test code based on the changed portion, wherein generation of the test code update includes generation of test code for the changed portion;

communicating, by the test tool to the user repository, a pull request that requests that the user repository add the test code update to the user repository;

receiving, by the test tool, a pull command from the user repository in response to the user repository receiving the pull request and in response to a determination at the user repository to pull the test code update; and communicating, by the test tool, the test code update to the user repository in response to the pull command.

7. The non-transitory computer-readable storage media of claim 6, wherein the changed portion includes a portion of the user product code that includes one or more of an addition to the user product code and a deletion from the user product code.

8. The non-transitory computer-readable storage media of claim 6, wherein generating the test code update includes generating a plurality of test code versions based on a branching mechanism.

9. The non-transitory computer-readable storage media of claim 6, wherein the operations further comprise generating, by the test tool, an indication that the test code update corresponds to the changed portion, wherein the indication facilitates identification of the changed portion.

10. The non-transitory computer-readable storage media of claim 6, wherein detecting the change in the user repository includes receiving, by the test tool from the user repository, an indication that the user product code was changed.

* * * * *